United States Patent
Cho et al.

(10) Patent No.: US 7,421,287 B2
(45) Date of Patent: Sep. 2, 2008

(54) MOBILE COMMUNICATION TERMINAL AND METHOD FOR MANAGING USE-HISTORY INFORMATION

(75) Inventors: Cheong-Hun Cho, Gumi-si (KR); Yong-Hyon Kim, Suwon-si (KR)

(73) Assignee: Sammsung Electronics Co., Ltd., Suwon Si (KR)

( * ) Notice: Subject to any disclaimer, the term of this patent is extended or adjusted under 35 U.S.C. 154(b) by 759 days.

(21) Appl. No.: 11/044,226

(22) Filed: Jan. 28, 2005

(65) Prior Publication Data
US 2005/0181829 A1    Aug. 18, 2005

(30) Foreign Application Priority Data
Feb. 12, 2004  (KR) .................. 10-2004-0009198
Nov. 19, 2004  (KR) .................. 10-2004-0095103

(51) Int. Cl.
*H04Q 7/32*    (2006.01)
(52) U.S. Cl. .............. 455/558; 455/550.1; 455/557; 455/412.1; 455/412.2; 455/551
(58) Field of Classification Search .......... 455/558, 455/550.1, 412.1, 412.2, 575.1, 551, 557, 455/556.1, 556.2, 90.3, 422.1, 403, 426.1, 455/426.2, 418, 419, 420, 500, 517; 235/380, 235/382
See application file for complete search history.

(56) References Cited

U.S. PATENT DOCUMENTS

| | | | |
|---|---|---|---|
| 2004/0192386 A1* | 9/2004 | Aerrabotu et al. | 455/558 |
| 2004/0204092 A1* | 10/2004 | Sato | 455/558 |
| 2005/0153740 A1* | 7/2005 | Binzel et al. | 455/558 |
| 2005/0176465 A1* | 8/2005 | Fornell | 455/558 |

* cited by examiner

*Primary Examiner*—Keith T Ferguson
(74) *Attorney, Agent, or Firm*—Roylance, Abrams, Berdo & Goodman, LLP

(57) ABSTRACT

Disclosed is a mobile communication terminal having a subscriber identity module (SIM) card. The mobile communication terminal includes a memory unit for storing use-history information of the SIM card inserted into the mobile communication terminal according to a subscriber identity number of the inserted SIM card, and a controller for determining the subscriber identity number of the inserted SIM card, determining whether a predetermined storage area corresponding to the subscriber identity number exists in the memory unit, and generating the predetermined storage area in the memory unit when the predetermined storage area does not exist in the memory unit. Further, it is possible to search the use-history information stored in a storage area corresponding to the subscriber identity number of each SIM card carried by a user. Therefore, the security for the use-history information of the SIM card can be ensured.

27 Claims, 7 Drawing Sheets

MOBILE COMMUNICATION TERMINAL AND METHOD FOR MANAGING USE-HISTORY INFORMATION

PRIORITY

This application claims priority under 35 U.S.C. §119(a) to an application entitled "Mobile Communication Terminal and Method for Managing Use-History Information" filed in the Korean Intellectual Property Office on Feb. 12, 2004 and assigned Serial No. 2004-9198 and to another application filed in the Korean Intellectual Property Office on Nov. 19, 2004 and assigned Serial No. 2004-95103, the entire contents of both applications are expressly incorporated herein by reference.

BACKGROUND OF THE INVENTION

1. Field of the Invention

The present invention relates to a method for managing the use-history information of a mobile communication terminal employing a global system for mobile communication (GSM) scheme. More particularly, the present invention relates to a mobile communication terminal and a method capable of effectively managing the use-history information of a GSM-type mobile communication terminal.

2. Description of the Related Art

Mobile communication terminals are widely used by many people regardless of age, sex or social-economic status. Further, it is expected that the demand for such mobile communication terminals will increase in the future. Accordingly, mobile communication providers add various functions to their products as a means to differentiate their products versus those of other mobile communication terminal providers.

Generally, mobile communication terminals are an apparatus for communicating with other people, regardless of where they are, and also for exchanging data. These mobile communication terminals include cellular phones, personal digital assistants (PDAs), personal communication service (PCS) phones, international mobile telecommunication-2000 (IMT-2000) terminals, GSM terminals, among others.

Among the many functions provided by the mobile communication terminals as described above, a memory function stores a plurality of phone numbers required by users and can also store other user information (e.g., schedules, commemoration days, important memos, photographs, etc).

Mobile communication terminals are also available that are provided with smart, and the flash memory of the smart card stores user information and various data. One way to use the smart card is to provide a roaming service of a mobile communication terminal by means of a mobile communication terminal user identity module embedded in the smart card. A smart card for the mobile communication terminal user identity module includes a subscriber identity module (SIM) card of a GSM system, a universal subscriber identity module (USIM) card of a universal mobile telecommunication system (UMTS), a user identity module (UIM) card, and a removal user identity module (RUIM) card of a code division multiple access (CDMA) system, among others. The smart card equipped with the aforementioned user identity modules therein uses a contact type smart card in order to share information with the mobile communication terminal.

In the GSM system, which is a mobile communication system used widely in Europe, the aforementioned SIM card is used and includes a subscriber identity module, which is an interface between a mobile communication terminal and a network. This facilitates the replacement of a mobile communication terminal and the change of a communication provider. The SIM card has a microprocessor and a memory chip therein, stores all information necessary for the operation of a mobile communication terminal, and stores user information as well as related data such as phone numbers and network numbers. Accordingly, since a GSM mobile communication terminal cannot perform a communication without a subscriber authentication through a SIM card, the GSM mobile communication terminal can perform only emergency calls when not equipped with the SIM card.

As described above, since use-history information may be stored in the SIM card or the memory of the mobile communication terminal, the user of the mobile communication terminal may not carry a separate memo notebook such as a phone book. If, however, a user carrying a SIM card stores the use-history information of the SIM card in a shared mobile communication terminal a different user carrying a different SIM card also use the shared mobile communication terminal, the SIM card use information of the previous user, which has been already stored in the mobile communication terminal, may be overwritten or lost. Furthermore, there is the problem that transmission/reception communication records, such as the most recent communication made, may also be overwritten and lost.

SUMMARY OF THE INVENTION

Accordingly, the present invention has been made to solve the above-mentioned problems and others not mentioned in the prior art, and it is an object of the present invention to provide a mobile communication terminal and a method capable of effectively managing the use-history information of a GSM mobile communication terminal.

It is another object of the present invention to provide a mobile communication terminal and a method capable of ensuring the management and security of information for each SIM card when one mobile communication terminal uses a plurality of SIM cards.

In accordance with one aspect of the present invention, there is provided a mobile communication terminal having a subscriber identity module (SIM) card, the mobile communication terminal comprising a memory unit for storing use-history information of the SIM card inserted into the mobile communication terminal according to a subscriber identity number of the inserted SIM card, and a controller for determining the subscriber identity number of the inserted SIM card, examining whether a predetermined storage area corresponding to the subscriber identity number exists in the memory unit, and generating the predetermined storage area in the memory unit when the predetermined storage area does not exist in the memory unit.

In accordance with another aspect of the present invention, there is provided a method for managing use-history information of a mobile communication mobile, wherein the method comprises determining a subscriber identity number of the inserted SIM card when one SIM card of multiple SIM cards is inserted into the mobile communication mobile and then the mobile communication mobile is powered on, examining whether a predetermined storage area corresponding to the subscriber identity number of the inserted SIM card exists in an entire storage area of the mobile communication mobile, generating the predetermined storage area when the predetermined storage area corresponding to the subscriber identity number does not exist in the entire storage area of the mobile communication mobile, and storing use-history information of the inserted SIM card in the predetermined storage area.

According to an exemplary embodiment of the present invention, the step of generating the predetermined storage area comprises loading the use-history information of the SIM card stored in the predetermined storage area and mapping the loaded information according to each menu of a user interface, when the predetermined storage area corresponding to the subscriber identity number exists in the entire storage area of the mobile communication mobile.

In accordance with another aspect of the present invention, there is provided a method for managing use-history information of a mobile communication mobile, wherein the method comprises determining a subscriber identity number of the inserted SIM card when one SIM card of multiple SIM cards is inserted into the mobile communication mobile and then the mobile communication mobile is powered on, registering the inserted SIM card as a master when a master registration request is received from a user of the mobile communication mobile, and generating a predetermined storage area corresponding to a subscriber identity number of the SIM card registered as the master and storing use-history information of the registered master SIM card in the generated predetermined storage area.

According to an exemplary embodiment of the present invention further comprises displaying a screen for selecting an operation mode of the mobile communication terminal when a mode setting request is received from a user of the SIM card registered as the master, and performing a selected operation mode based on selection information of the user.

In accordance with still another aspect of the present invention, there is provided a method for managing use-history information of a mobile communication mobile, wherein the method comprises determining a subscriber identity number of the inserted SIM card when one SIM card of multiple SIM cards is inserted into the mobile communication mobile and then the mobile communication mobile is powered on, examining whether a predetermined storage area corresponding to the subscriber identity number of the inserted SIM card exists in an entire storage area of the mobile communication mobile, checking whether there exists a slave registration request for registering the inserted SIM card as a slave when the predetermined storage area corresponding to the subscriber identity number does not exist in the entire storage area of the mobile communication mobile, registering the inserted SIM card as the slave when there exists the slave registration request, and generating the predetermined storage area corresponding to the subscriber identity number of the SIM card registered as the slave and storing use-history information of the registered slave SIM card in the generated predetermined storage area.

In accordance with yet another aspect of the present invention, there is provided a method for managing use-history information of a mobile communication mobile, wherein the method comprises determining a subscriber identity number of the inserted SIM card when one SIM card of multiple SIM cards is inserted into the mobile communication mobile and then the mobile communication mobile is powered on, checking whether an operation mode of the mobile communication terminal is a single mode in which only an SIM card registered as a master uses a predetermined storage area of the mobile communication terminal or a multi-mode in which a plurality of SIM cards use the predetermined storage area, examining whether a predetermined storage area corresponding to the subscriber identity number of the inserted SIM card exists in an entire storage area of the mobile communication mobile, when the mobile communication mobile operates in the multi-mode, checking whether the inserted SIM card is the SIM card registered as the master when the predetermined storage area corresponding to the subscriber identity number exists in the entire storage area of the mobile communication mobile, and loading use-history information of the master SIM card stored in the predetermined storage area when the inserted SIM card is the master SIM card.

According to an exemplary embodiment of the present invention, the method further comprises checking whether the inserted SIM card is the SIM card registered as the master when the mobile communication mobile operates in the single-mode, and loading use-history information of the master SIM card in the predetermined storage area corresponding to the subscriber identity number of the master SIM card when the inserted SIM card is the master SIM card.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENT

Figure 1:
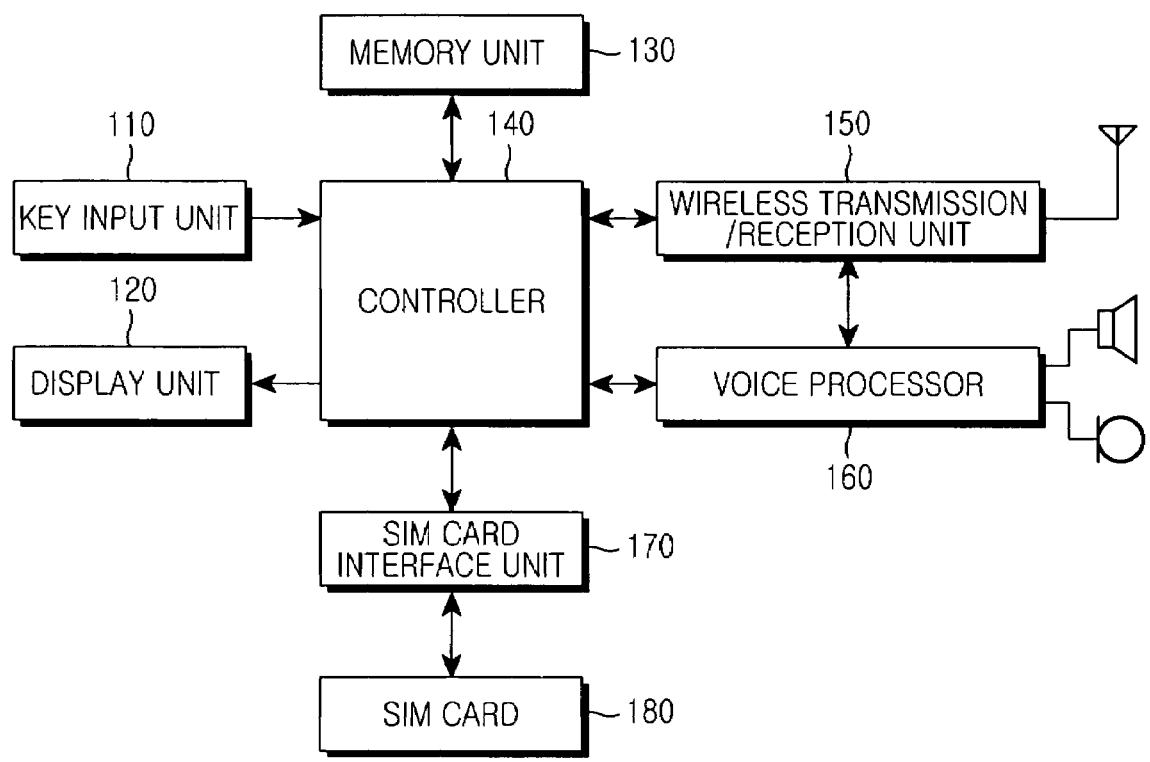
FIG. 1 is a block diagram of a mobile communication terminal according to an embodiment of the present invention.

Hereinafter, exemplary embodiments according to the present invention will be described with reference to the accompanying drawings. In the drawings, the same or similar elements are denoted by the same reference numerals even though they are depicted in different drawings. In the following description of the exemplary embodiments of the present invention, a detailed description of known functions and configuration incorporated herein will be omitted when it may make the subject matter of the present invention rather unclear.

FIG. 1 is a block diagram of a mobile communication terminal according to an embodiment of the present invention. The mobile communication terminal shown in FIG. 1 includes a key input unit 110, a display unit 120, a memory unit 130, a controller 140, a wireless transmission/reception unit 150, a voice processor 160 and an SIM card interface unit 170.

The key input unit 110 has a key matrix structure, and includes a character key, a numeral key and various function keys, and outputs a key input signal that corresponds to a key pressed by a user to the controller 140. The display unit 120 includes a Liquid Crystal Display (LCD), although other types of displays can also be used, and outputs various display data generated in the mobile communication terminal under control of the controller 140.

The memory unit 130 stores various information necessary for the operation of the mobile communication terminal. Further, the memory unit 130 stores the use-history information of a SIM card inserted into the mobile communication terminal according to a subscriber identity number (e.g. an international mobile station identity (IMSI)) of the SIM card. The memory unit 130 stores the use-history information of each SIM card inserted into the mobile communication terminal in a predetermined storage area corresponding to the subscriber identity number of each SIM card. Herein, the use-history information includes, but is not limited to, a memo record of the user of the mobile communication terminal having the SIM card, a communication record list representing transmission/reception communication information, a telephone directory, an initial set-up screen of the mobile communication terminal, and a transmission/reception message.

The controller 140 controls the general operation of the mobile communication terminal according to an embodiment of the present invention. When the mobile communication terminal is powered on after the SIM card is inserted into the mobile communication terminal, the controller 140 determines (or judges) the subscriber identity number of the inserted SIM card. It is possible to also provide a separate apparatus for determining the subscriber identity number of the inserted SIM card, and such others separate apparatus, although not particularly listed, are considered within the scope of the embodiments of the present invention.

The controller 140 examines whether the predetermined storage area corresponding to the subscriber identity number exists in the storage area of the memory unit 130. If, as a result of the examination, the predetermined storage area does not exist in the storage area, the controller 140 generates the predetermined storage area corresponding to the subscriber identity number in memory unit 130. In contrast, when the predetermined storage area exists in the storage area, the controller 140 loads the use-history information of the SIM card, which has been already stored in the predetermined storage area, and maps the loaded information according to each menu of a user interface. Herein, when the predetermined storage area corresponding to the subscriber identity number of the inserted SIM card does not exist in the storage area, the controller 140 can register the inserted SIM card as a slave on the basis of the slave registration request of a user.

When the use-history information of the inserted SIM card is generated, the controller 140 stores the information in the predetermined storage area corresponding to the subscriber identity number of the inserted SIM card from among all the storage areas of the memory unit 130. From among the stored information, the communication record list representing the transmission/reception communication information can be recorded in the inserted SIM card under the control of the controller 140.

When a master registration request is received from the user of the mobile communication terminal, the controller 140 registers the inserted SIM card as a master and generates a predetermined storage area, which corresponds to the subscriber identity number of the registered SIM card, in the memory unit 130. Further, when a mode setting request is received from the user of the SIM card registered as the master, the controller 140 displays a screen for selecting the operation mode of the mobile communication terminal through the display unit 120.

The operation mode can be either a single mode or a multi-mode. In the single mode, only the SIM card registered as the master can use the predetermined storage area generated in the memory unit 130 of the mobile communication terminal. In contrast, in the multi-mode, a plurality of SIM cards can use the predetermined storage area generated in the memory unit 130 of the mobile communication terminal.

The controller 140 controls the mobile communication terminal to perform a selected operation mode based on user selection information. Further, when a SIM card inserted in the multi-mode of the mobile communication terminal is the SIM card registered as the master, the controller 140 generates and loads the use-history information of the master SIM card and a slave SIM card list registered in the mobile communication terminal. The controller 140 generates the slave SIM card list in order to allow the registration information of the slave SIM card registered in the mobile communication terminal to be easily managed.

The wireless transmission/reception unit 150 is a radio frequency (RF) unit that includes a high frequency processor, an intermediate frequency processor and a baseband processor. Furthermore, the wireless transmission/reception unit 150 manages transmission and reception of voice data, text data, image data and control data under the control of the controller 140.

The voice processor 160 modulates an electrical signal received from a microphone and converts the modulated electrical signal into a voice data signal. The voice processor 160 also demodulates an encoded voice data signal received from the wireless transmission/reception unit 150 into an electrical signal, and outputs the electrical signal to a speaker. The SIM card interface unit 170 provides interface environments with an SIM card 180.

Figure 2:
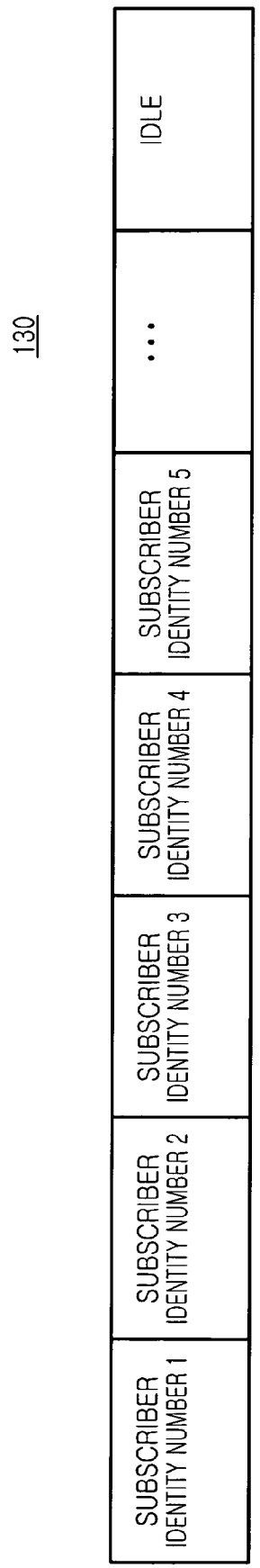
FIG. 2 is a diagram showing the structure of a memory unit of a mobile communication terminal according to an embodiment of the present invention.

FIG. 2 is a diagram showing the structure of the memory unit 130 of the mobile communication terminal according to the embodiment of the present invention. Referring to FIG. 2, the memory unit 130 includes predetermined storage areas generated according to the subscriber identity numbers of each SIM card. The number of the predetermined storage areas is limited according to the capacity of the memory unit 130 and can be initialized by the operation of a user.

Figure 3:
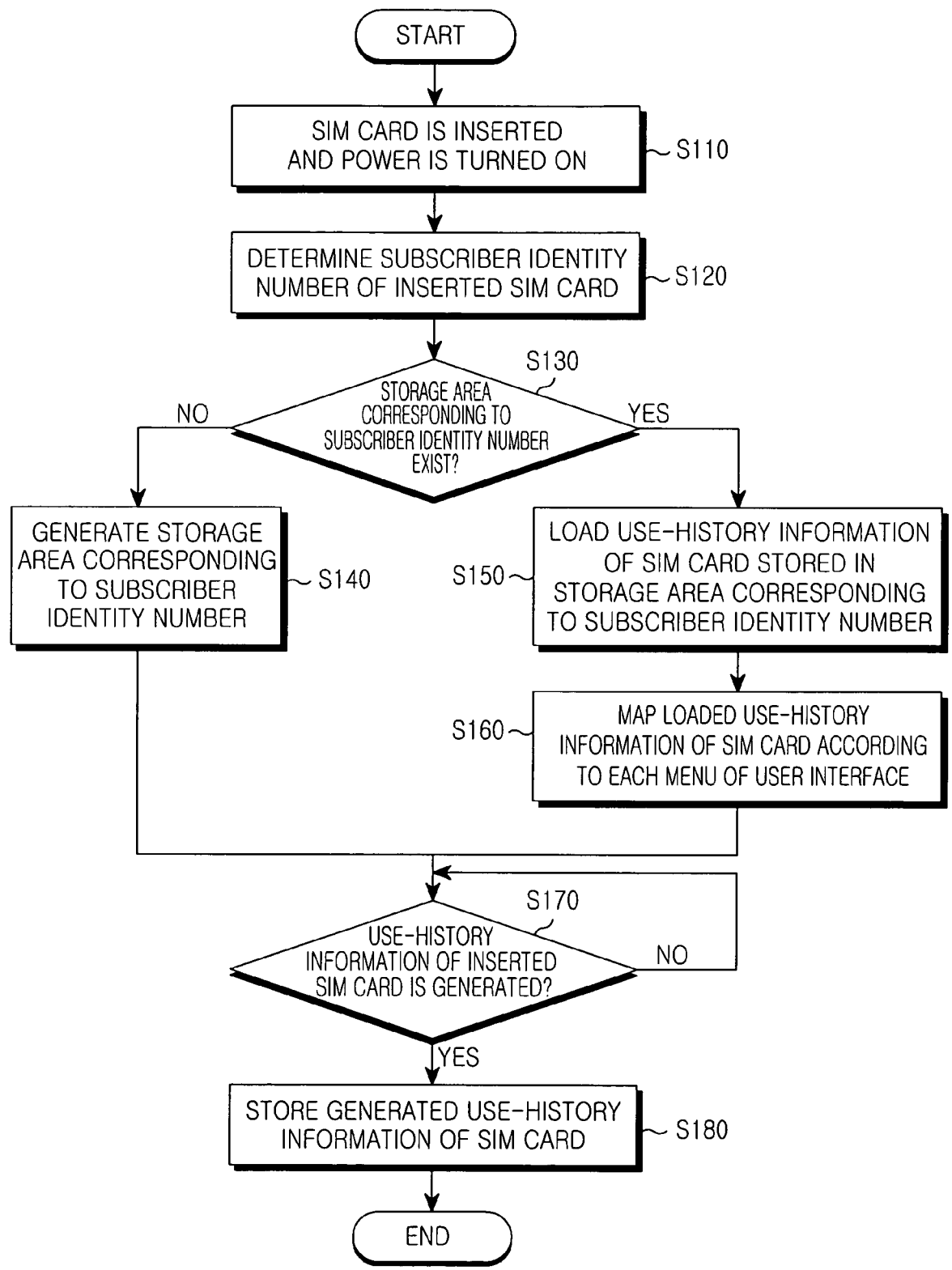
FIG. 3 is a flow diagram illustrating a process for storing the use-history information of a mobile communication terminal according to a first embodiment of the present invention.

FIG. 3 is a flow diagram illustrating a process for storing the use-history information of a mobile communication terminal according to an embodiment of the present invention. Referring to FIGS. 1 and 3, when an SIM card is inserted into the mobile communication terminal and the mobile communication terminal is powered on (S110), the controller 140 determines the subscriber identity number of the inserted SIM card (S120).

The controller 140 examines whether a predetermined storage area corresponding to the subscriber identity number of the inserted SIM card exists in the entire storage area of the memory unit 130 (decision step S130). As a result of the examination, if it is determined that the predetermined storage area corresponding to the subscriber identity number does not exist in the entire storage area ("No" path from decision step S130), the controller 140 generates the predetermined storage area (S140). Herein, the controller 140 can output a message requesting the user to set a password for security when generating the predetermined storage area.

The controller 140 then examines whether the use-history information of the SIM card inserted into the mobile communication terminal is generated (decision step S170). Herein, as described above, the use-history information includes a memo record generated during the use of the mobile communication terminal provided with the SIM card, a communication record list, a telephone directory, an initial set-up screen of the mobile communication terminal, a transmission/reception message, among other types of information.

If, as a result of the examination, the use-history information is generated ("Yes" path from decision step S170), the controller 140 stores the use-history information in the predetermined storage area generated in the memory unit 130 according to the subscriber identity number (S180). If, as a result of the examination in decision step 130, the predetermined storage area corresponding to the subscriber identity number does exist in the entire storage area ("Yes" path from decision step S130), the controller 140 loads the use-history information of the SIM card already stored in the predetermined storage area (S150). The already stored information on the use history of the SIM card is the information that was stored when the user last used the SIM card. Since the loaded use-history information has already been stored in the predetermined storage area corresponding to the corresponding subscriber identity number, other SIM card users, except for the corresponding SIM card user, cannot access the use-history information. The controller 140 then maps the loaded use-history information according to each menu of a user interface (S160).

As previously described, the controller 140 then examines whether the use-history information of the inserted SIM card is generated (decision S170). As described above, the use-history information includes a memo record generated during the use of the mobile communication terminal provided with the SIM card, a communication record list, a telephone directory, an initial set-up screen of the mobile communication terminal, a transmission/reception message, among other types of information.

If, as a result of the examination, the use-history information is generated ("Yes" path from decision step S170), the controller 140 stores the use-history information in the predetermined storage area generated in the memory unit 130 according to the subscriber identity number (S180). Herein, the controller 140 can control the communication record list representing transmission and reception communication information from among the use-history information to be stored in the memory of the inserted SIM card.

Figure 4:
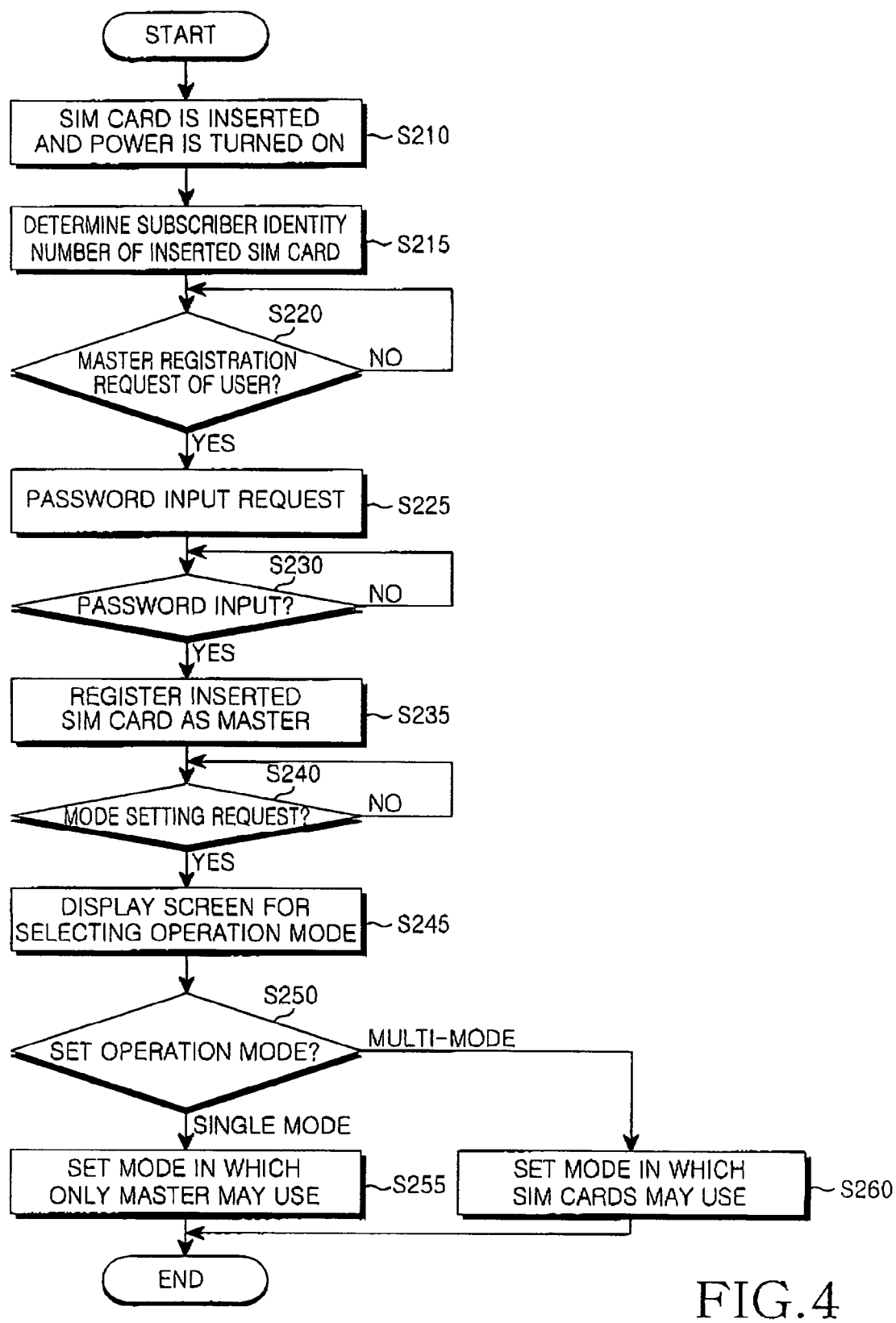
FIG. 4 is a flow diagram illustrating a registration process of a master SIM card in a mobile communication terminal according to a second embodiment of the present invention.

FIG. 4 is a flow diagram illustrating a registration process of a master SIM card in a mobile communication terminal according to a second embodiment of the present invention. Referring to FIGS. 1 and 4, when an SIM card is inserted into the mobile communication terminal and the mobile communication terminal is powered on (S210), the controller 140 judges (determines) the subscriber identity number of the inserted SIM card (S215).

The controller 140 then examines whether a master registration request is received from a user (decision step S220). "Master" means the original user of the mobile communication terminal. If as a result of the examination it is determined that the master registration request has been received from the user ("Yes" path from decision step S220), the controller 140 outputs a message for requesting password input (S225). The message can include a voice message or a text message.

The method then determines whether a password has been entered by the user. If an input password that has been entered by the user in response to a password input request matches the already stored password ("Yes" path from decision step S230), the controller 140 registers the subscriber identity number of the inserted SIM card as a master (S235). The controller 140 generates a predetermined storage area corresponding to the subscriber identity number of the inserted SIM card and registers the SIM card as the master. The predetermined storage area stores the use-history information of the registered master SIM card.

After the controller 140 registers the inserted SIM card as the master, the method determines whether an operation mode setting request for the mobile communication terminal has been made (decision step S240). If a mode setting has been made ("Yes" path from decision step S240), the controller 140 displays a screen for selecting the operation mode of the mobile communication terminal (S245). In decision step S250, the method determines whether an operation mode has been set. If a single mode is selected by the selection information of a user ("Single Mode" path from decision step S250), the controller 140 sets the mode of the mobile communication terminal as the single mode in which only the master can use the predetermined storage area generated in the memory unit 130 (S255). In contrast, when a multi-mode is selected by the selection information of the user ("Multi Mode" path from decision step S250), the controller 140 sets the mode of the mobile communication terminal as the multi-mode in which a plurality of SIM cards can use the predetermined storage area generated in the memory unit 130 (S260).

Figure 5:
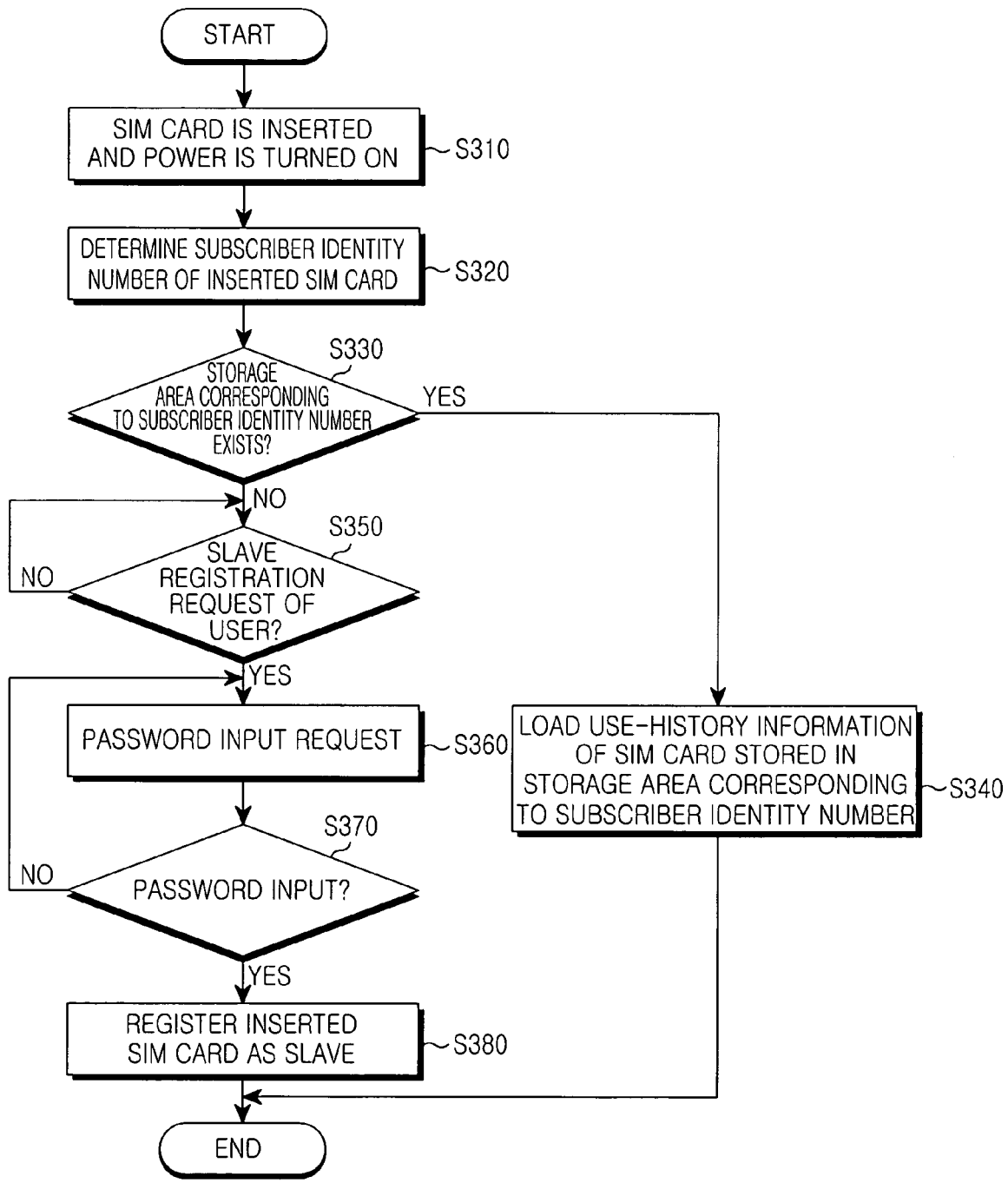
FIG. 5 is a flow diagram illustrating a registration process of a slave SIM card in a mobile communication terminal according to the second embodiment of the present invention.

FIG. 5 is a flow diagram illustrating a registration process of a slave SIM card in a mobile communication terminal according to a second embodiment of the present invention. Referring to FIGS. 1 and 5, when an SIM card is inserted into the mobile communication terminal and the mobile communication terminal is powered on (S310), the controller 140 judges (determines) the subscriber identity number of the inserted SIM card (S320).

The controller 140 then determines whether a predetermined storage area corresponding to the subscriber identity number of the inserted SIM card exists in an entire storage area of the memory unit 130 (decision step S330). If, as a result of the checking, it is determined that a predetermined storage area corresponding to the subscriber identity number exists in the entire storage area ("Yes" path from decision step S330), (i.e., when a slave registration has been accomplished), the controller 140 loads the use-history information of the SIM card already stored in the predetermined storage area (S340). The already stored information on the use-history of the SIM card is information that was stored for the user that last used the SIM card. Since the loaded use-history information has already stored in the predetermined storage area corresponding to the corresponding subscriber identity number, other SIM card users, except for the corresponding SIM card user, cannot access the use-history information. Then, the controller 140 maps the loaded use-history information according to each menu of a user interface.

If, however, a predetermined storage area corresponding to the subscriber identity number does not exist in the entire storage area ("No" path from decision step S330), the controller 140 determines that no use-history information exists and determines whether there exists a slave registration request (decision step S350). In the slave registration process, the inserted SIM card can use the mobile communication terminal when the mobile communication terminal operates in a multi-mode.

If a slave registration request for using a plurality of SIM cards exists ("Yes" path from decision step S350), the controller 140 outputs a message requesting password to be input in order to determine whether the user is a master (S360). If the input password entered by the user in response to the password input request matches with the already stored password ("Yes" path from decision step S370), the controller 140 determines the user as the master and registers the subscriber identity number of the inserted SIM card as a slave (S380). The controller 140 generates a predetermined storage area corresponding to the subscriber identity number of the inserted SIM card and registers the SIM card as the slave. The predetermined storage area stores the use-history information of the registered slave SIM card.

Figure 6:
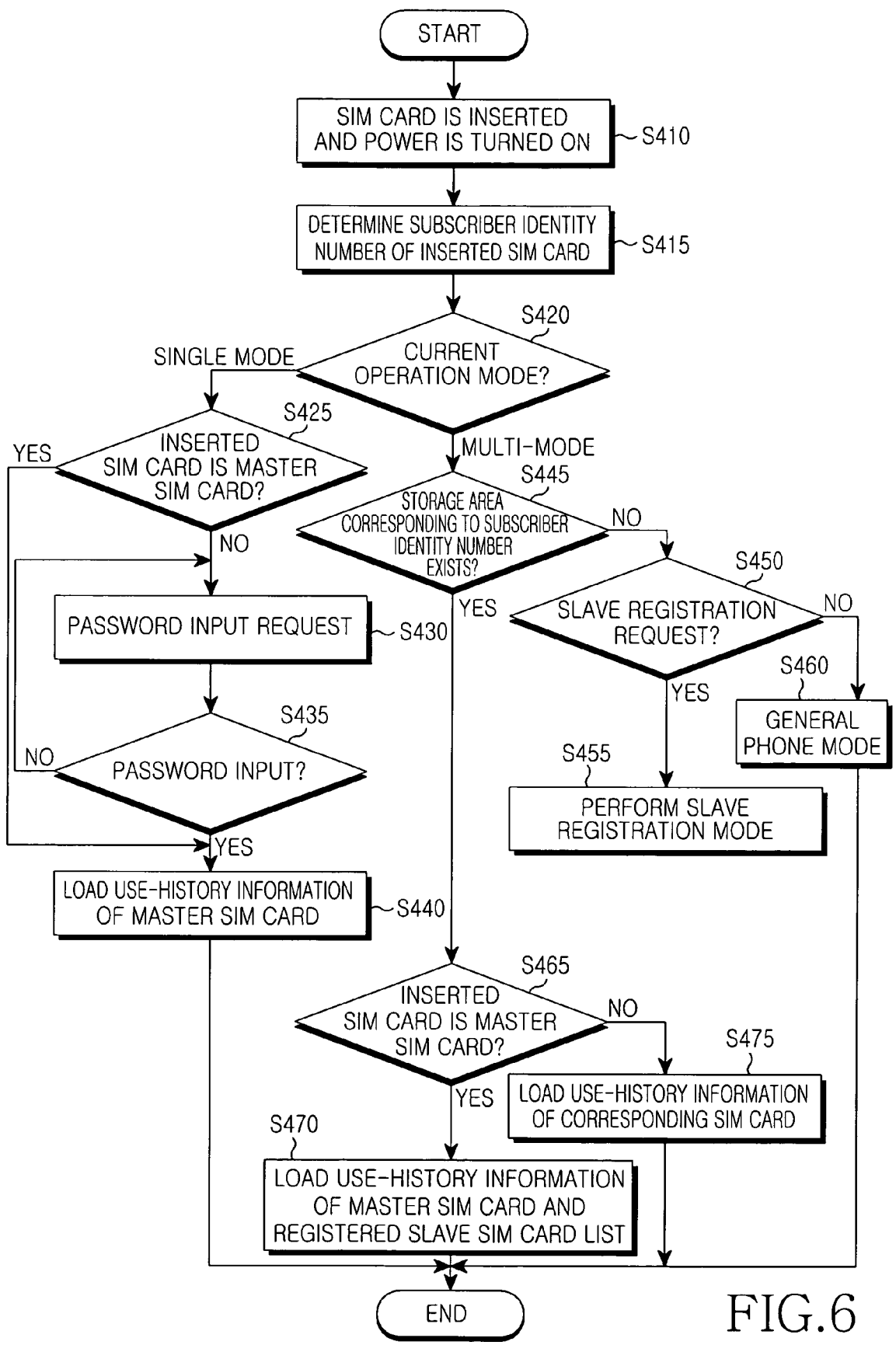
FIG. 6 is a flow diagram illustrating a process for managing the use-history information of a mobile communication terminal according to the second embodiment of the present invention.

FIG. 6 is a flow diagram illustrating a process for managing the use-history information of a mobile communication terminal according to a second embodiment of the present invention. When an SIM card is inserted into the mobile communication terminal and the mobile communication terminal is powered on (S410), the controller 140 determines the subscriber identity number of the inserted SIM card (S415).

The controller 140 then determines whether the current operation mode of the mobile communication terminal is a single mode, in which only an SIM card registered as a master can use a predetermined storage area generated in the memory unit 130, or a multi-mode, in which a plurality of SIM cards can use the predetermined storage area (S420). If, as a result of the determination, it is found that the operation mode of the mobile communication terminal is the single mode ("Single Mode" path from decision step S420), the controller 140 determines whether the inserted SIM card is the SIM card registered as the master (decision step S425).

In decision step S425, the controller 140 compares the subscriber identity number of the inserted SIM card with the subscriber identity number of the SIM card registered as the master. If the two subscriber identity numbers coincide with each other ("Yes" path from decision step S425), the controller 140 determines that the inserted SIM card is the master and loads the use-history information of the master SIM card in a storage area corresponding to the subscriber identity number of the master SIM card (S440). If, however, the subscriber identity number of the inserted SIM card does not coincide with the subscriber identity number of the SIM card registered as the master ("No" path from decision step S425), the controller 140 requests a password input in order to determine whether the user of the inserted SIM card is a master (S430).

When an input password is entered by the user in response to the password input request, and it matches with the already stored password ("Yes" path from decision step S435), the controller 140 loads the use-history information of the master SIM card in the storage area corresponding to the subscriber identity number of the master SIM card (S440). When the inserted SIM card is not the master SIM card, the controller 140 can also control the mobile communication terminal to operate in a general phone mode without using the predetermined storage area generated in the memory unit 130.

If the operation mode of the mobile communication terminal is the multi-mode ("Multi-mode" path from decision step S420), the controller 140 then determines whether a predetermined storage area corresponding to the subscriber identity number of the inserted SIM card exists in an entire storage area of the memory unit 130 (decision step S445). If it is determined that the predetermined storage area corresponding to the subscriber identity number of the inserted SIM card does not exist in the entire storage area ("No" path from decision step S445), the controller 140 then examines whether there exists a slave registration request (decision step S450).

If the slave registration request does exist ("Yes" path from decision step S445), the controller 140 allows the mobile communication terminal to shift to a slave registration mode and allows the slave registration process as shown in FIG. 5 to be performed (S455). In contrast, if the slave registration request does not exist ("No" path from decision step S450), the controller 140 controls the mobile communication terminal to shift to a general phone mode (S460). The user of the inserted SIM card cannot generate a predetermined storage area in the memory unit 130 and store use-history information in the generated storage area. Instead, the user may use only a general phone communication function.

If the predetermined storage area corresponding to the subscriber identity number of the inserted SIM card does exist in the entire storage area ("Yes" path from decision step S445), the controller 140 then determines whether the inserted SIM card is a master SIM card (decision step S465). If the subscriber identity number of the inserted SIM card is compared with the subscriber identity number of the SIM card registered as the master and the two subscriber identity numbers coincide with each other ("Yes" path from decision step S465), according to an exemplary embodiment of the present invention, the inserted SIM card is determined as the master SIM card.

In decision step S465, the controller 140 compares the subscriber identity number of the inserted SIM card with the subscriber identity number of the SIM card registered as the master. If, as a result of the comparison, it is determined that the two subscriber identity numbers match each other ("Yes" path from decision step S465), the controller 140 determines that the inserted SIM card is the master SIM card. Then, the controller 140 loads use-history information corresponding to the subscriber identity number of the master SIM card and a slave SIM card list, which has been registered in the mobile communication terminal, in the memory unit 130 (S470). The user of the master SIM card can also edit the registration information of the registered slave SIM card while seeing the slave SIM card list as shown in FIGS. 7a and 7b.

Figure 7B:
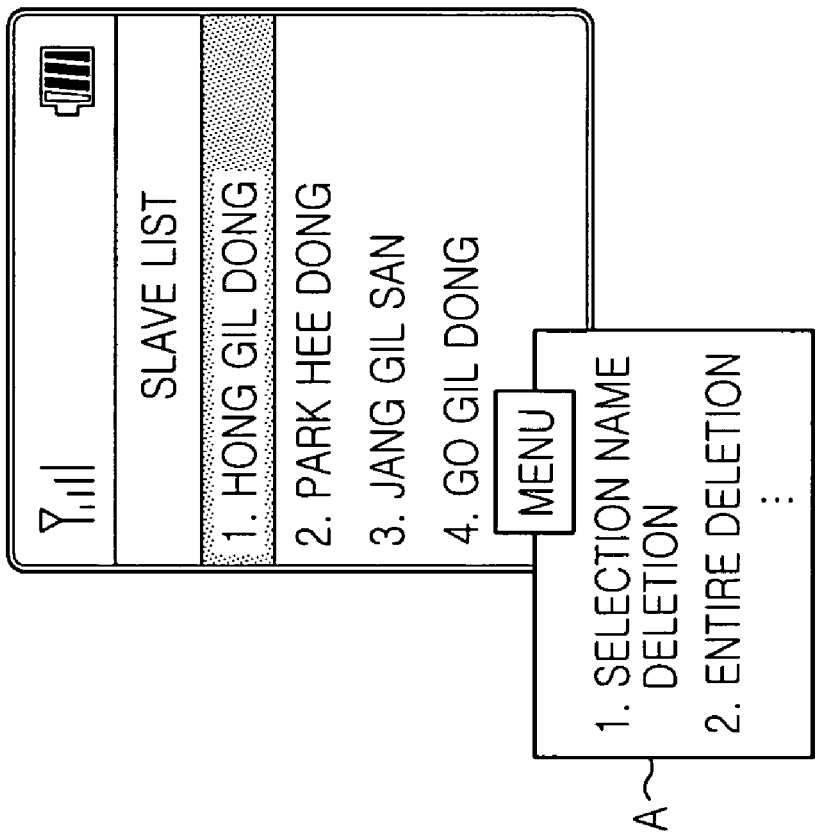
FIGS. 7a and 7b are diagrams showing slave lists registered in a mobile communication terminal according to the second embodiment of the present invention.
Figure 7A:
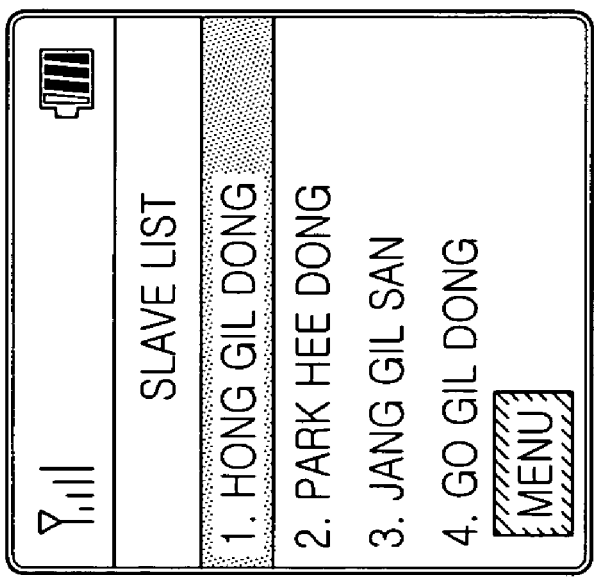

FIGS. 7a and 7b are diagrams showing slave lists registered in a mobile communication terminal according to a second embodiment of the present invention. Referring to FIG. 7a, in the shown screen, the user of the mobile communication terminal selects one of the displayed slave lists in order to edit the registration information of the slave SIM card. When the user of the mobile communication terminal inputs a menu key after selecting "Hong Gil Dong" in the screen of FIG. 7a, the screen of FIG. 7a changes. A screen that includes window A that contains both a deletion menu of the selected name (i.e., the selected slave), and a deletion menu of the entire slave list, as shown in FIG. 7b. Then, the user can edit the registration information of the slave SIM card registered in the mobile communication terminal through window A.

If the inserted SIM card is not the master SIM card ("No" path from decision step S465), the controller 140 determines that the inserted SIM card is a slave SIM card and loads use-history information corresponding to the subscriber identity number of the inserted SIM card in the memory unit 130 (S475). According to the embodiments of the present invention as described herein, when one mobile communication terminal uses a plurality of SIM cards, it is possible to store the use-history information of each SIM card in only a storage area corresponding to the subscriber identity number of each SIM card and search the stored use-history information. Therefore, it is possible to obtain the effect of individual use even though the mobile communication terminal is used in common with other users.

In accordance with another aspect in an embodiment of the present invention, it is possible to search only the use-history information stored in a storage area corresponding to the subscriber identity number of each SIM card carried by a user. Therefore, security for the use-history information of the SIM card can be ensured.

Although several embodiment of the present invention have been described for illustrative purposes, those skilled in the art will appreciate that various modifications, additions and substitutions are possible, without departing from the scope and spirit of the invention as disclosed in the accompanying claims.

What is claimed is:

1. A mobile communication terminal having a subscriber identity module (SIM) card, the mobile communication terminal comprising:
   a memory unit for storing use-history information of the SIM card inserted into the mobile communication terminal according to a subscriber identity number of the inserted SIM card; and
   a controller for determining the subscriber identity number of the inserted SIM card, examining whether a predetermined storage area corresponding to the subscriber identity number exists in the memory unit, and generating the predetermined storage area in the memory unit when the predetermined storage area does not exist in the memory unit.

2. The mobile communication terminal as claimed in claim 1, wherein, when the predetermined storage area corresponding to the subscriber identity number exists in the memory unit, the controller loads the use-history information of the SIM card stored in the predetermined storage area and maps the loaded information according to each menu of a user interface.

3. The mobile communication terminal as claimed in claim 1, wherein the memory unit stores the use-history information in the predetermined storage area corresponding to the subscriber identity number, the use-history information including a memo record of a user of the SIM card inserted into the mobile communication terminal, a communication record list, a telephone directory, an initial set-up screen of the mobile communication terminal, and a transmission/reception message.

4. The mobile communication terminal as claimed in claim 1, wherein, when a master registration request is received from a user of the mobile communication terminal after a predetermined SIM card is inserted into the mobile communication terminal, the controller registers the inserted SIM card as a master and controls a predetermined storage area corresponding to a subscriber identity number of the SIM card registered as the master to be generated in the memory unit.

5. The mobile communication terminal as claimed in claim 4, wherein, in response to a mode setting request of a user of the SIM card registered as the master, the controller sets an operation mode of the mobile communication terminal as one of a single mode in which only the SIM card registered as the master uses the predetermined storage area generated in the memory unit and a multi-mode in which a plurality of SIM cards use the predetermined storage area.

6. The mobile communication terminal as claimed in claim 1, wherein, when a predetermined SIM card is inserted into the mobile communication terminal and then a slave registration request is received from a user of an SIM card registered as a master, the slave registration request allows the inserted SIM card to use the mobile communication terminal when the mobile communication terminal operates in a multi-mode, and the controller registers the inserted SIM card as a slave and controls a predetermined storage area corresponding to a subscriber identity number of the registered SIM card to be generated in the memory unit.

7. The mobile communication terminal as claimed in claim 1, wherein, when the inserted SIM card is an SIM card registered as a master when the mobile communication terminal operates in a multi-mode, the controller generates and loads use-history information of the master SIM card and a slave SIM card list for managing registration information of a slave SIM card registered in the mobile communication terminal.

8. The mobile communication terminal as claimed in claim 1, wherein the controller records a communication record list representing transmission/reception communication information that is included in the use-history information stored in the memory unit, in the inserted SIM card.

9. A method for managing use-history information of a mobile communication terminal, when one SIM card of multiple SIM cards is inserted into the mobile communication terminal, and then the mobile communication terminal is powered on, the method comprising:
   a) determining a subscriber identity number of the inserted SIM card;
   b) determining whether a predetermined storage area corresponding to the subscriber identity number of the inserted SIM card exists in an entire storage area of the mobile communication terminal;
   c) generating the predetermined storage area when the predetermined storage area corresponding to the subscriber identity number does not exist in the entire storage area of the mobile communication terminal; and
   d) storing use-history information of the inserted SIM card in the predetermined storage area.

10. The method as claimed in claim 9, wherein the step of generating the predetermined storage area comprises:
    loading the use-history information of the SIM card stored in the predetermined storage area and mapping the loaded information according to each menu of a user interface when the predetermined storage area corresponding to the subscriber identity number exists in the entire storage area of the mobile communication terminal.

11. The method as claimed in claim 9, wherein the step of storing use-history information comprises:
    storing the use-history information in the predetermined storage area, wherein the use-history information comprises a memo record of a user of the SIM card inserted into the mobile communication terminal, a communication record list, a telephone directory, an initial set-up screen of the mobile communication terminal, and a transmission/reception message.

12. A method for managing use-history information of a mobile communication terminal, when one SIM card of multiple SIM cards is inserted into the mobile communication terminal and then the mobile communication terminal is powered on the method comprising:
    a) determining a subscriber identity number of the inserted SIM card;
    b) registering the inserted SIM card as a master when a master registration request is received from a user of the mobile communication terminal; and
    c) generating a predetermined storage area corresponding to a subscriber identity number of the SIM card registered as the master and storing use-history information of the registered master SIM card in the generated predetermined storage area.

13. The method as claimed in claim 12, wherein the step of registering the inserted SIM card comprises:
    outputting a message for requesting a password input in response to the master registration request from the user of the mobile communication terminal; and
    registering the inserted SIM card as the master when an input password inputted by the user in response to the password input request coincides with an already stored password.

14. The method as claimed in claim 12, wherein the step of storing use history comprises:
storing the use-history information in the predetermined storage area, wherein the use-history information comprises a memo record of a user of the SIM card inserted into the mobile communication terminal, a communication record list, a telephone directory, an initial set-up screen of the mobile communication terminal, and a transmission/reception message.

15. The method as claimed in claim 12, wherein the step of storing use history comprises:
storing a communication record list representing transmission/reception communication information which is included in the use-history information, in a memory of the inserted SIM card.

16. The method as claimed in claim 12, further comprising:
displaying a screen for selecting an operation mode of the mobile communication terminal when a mode setting request is received from a user of the SIM card registered as the master,; and
performing a selected operation mode based on selection information of the user.

17. The method as claimed in claim 16, wherein the operation mode of the mobile communication terminal is either a single mode in which only the SIM card registered as the master uses the predetermined storage area of the mobile communication terminal or a multi-mode in which a plurality of SIM cards use the predetermined storage area.

18. A method for managing use-history information of a mobile communication terminal, when one SIM card of multiple SIM cards is inserted into the mobile communication terminal and then the mobile communication terminal is powered on, the method comprising:
a) determining a subscriber identity number of the inserted SIM card;
b) determining whether a predetermined storage area corresponding to the subscriber identity number of the inserted SIM card exists in an entire storage area of the mobile communication terminal;
c) determining whether there exists a slave registration request for registering the inserted SIM card as a slave when the predetermined storage area corresponding to the subscriber identity number does not exist in the entire storage area of the mobile communication terminal;
d) registering the inserted SIM card as the slave when there exists the slave registration request; and
e) generating the predetermined storage area corresponding to the subscriber identity number of the SIM card registered as the slave and storing use-history information of the registered slave SIM card in the generated predetermined storage area.

19. The method as claimed in claim 18, wherein the step of registering the inserted SIM card comprises:
outputting a message for requesting a password input in order to determine whether the user is a user registered as a master, in response to the slave registration request from the user of the mobile communication terminal; and
registering the inserted SIM card as the slave when an input password entered by the user in response to the password input request matches an already stored password.

20. The method as claimed in claim 18, wherein the step of determining whether there exists a slave registration request comprises:
loading the use-history information of the SIM card stored in the predetermined storage area and mapping the loaded information according to each menu of a user interface when the predetermined storage area corresponding to the subscriber identity number exists in the entire storage area of the mobile communication terminal.

21. A method for managing use-history information of a mobile communication terminal, when one SIM card of multiple SIM cards is inserted into the mobile communication terminal and then the mobile communication terminal is powered on, the method comprising:
a) determining a subscriber identity number of the inserted SIM card;
b) determining whether an operation mode of the mobile communication terminal is a single mode in which only an SIM card registered as a master uses a predetermined storage area of the mobile communication terminal or a multi-mode in which a plurality of SIM cards use the predetermined storage area;
c) determining whether a predetermined storage area corresponding to the subscriber identity number of the inserted SIM card exists in an entire storage area of the mobile communication terminal, when the mobile communication terminal operates in the multi-mode;
d) determining whether the inserted SIM card is the SIM card registered as the master when the predetermined storage area corresponding to the subscriber identity number exists in the entire storage area of the mobile communication terminal; and
e) loading use-history information of the master SIM card stored in the predetermined storage area when the inserted SIM card is the master SIM card.

22. The method as claimed in claim 21, wherein the step of loading use-history information of the master SIM card comprises:
loading the use-history information of the master SIM card and mapping the loaded information according to each menu of a user interface.

23. The method as claimed in claim 21, wherein the step of loading use-history information of the master SIM card comprises:
generating and outputting a list of a slave SIM card registered in the mobile communication terminal.

24. The method as claimed in claim 21, wherein the step of loading use-history information of the master SIM card comprises:
loading use-history information of a corresponding SIM card stored in the predetermined storage area when the inserted SN card is not the master SIM card.

25. The method as claimed in claim 21, further comprising:
determining whether the inserted SIM card is the SIM card registered as the master when the mobile communication terminal operates in the single-mode; and
loading use-history information of the master SIM card predetermined storage area corresponding to the subscriber identity number of the master SIM card when the inserted SIM card is the master SIM card.

26. The method as claimed in claim 21, wherein the step of determining whether the inserted SIM card is the SIM card registered as the master comprises:
determining whether the subscriber identity number of the inserted SIM card matches a subscriber identity number of the already registered master SIM card; and
determining the inserted SIM card as the master SIM card when the two subscriber identity numbers match each other.

27. The method as claimed in claim 26, wherein step of determining whether the subscriber identity number of the inserted SIM card matches a subscriber identity number of the already registered master SIM card comprises:

outputting a message requesting a password input in order to determine whether a user of the inserted SIM card is a user registered as the master when the two subscriber identity numbers do not coincide with each other;

determining the user as the user registered as the master when an input password entered by the user in response to the password input request matches an already stored password.

* * * * *